United States Patent
Janiszewski

(10) Patent No.: US 10,456,824 B2
(45) Date of Patent: Oct. 29, 2019

(54) SAFETY POWER ASSIST FOR MANUAL PRESS

(71) Applicant: BTM Company LLC, Marysville, MI (US)

(72) Inventor: Joseph Andrew Janiszewski, Port Huron, MI (US)

(73) Assignee: BTM Company LLC, Marysville, MI (US)

(*) Notice: Subject to any disclaimer, the term of this patent is extended or adjusted under 35 U.S.C. 154(b) by 607 days.

(21) Appl. No.: 15/178,618

(22) Filed: Jun. 10, 2016

(65) Prior Publication Data

US 2017/0355010 A1   Dec. 14, 2017

(51) Int. Cl.

| | |
|---|---|
| *B21D 55/00* | (2006.01) |
| *B21J 15/28* | (2006.01) |
| *B30B 15/28* | (2006.01) |
| *F16P 3/00* | (2006.01) |
| *B30B 1/32* | (2006.01) |
| *B21D 39/03* | (2006.01) |

(52) U.S. Cl.
CPC ............. *B21D 55/00* (2013.01); *B21J 15/28* (2013.01); *B30B 1/326* (2013.01); *B30B 15/285* (2013.01); *F16P 3/001* (2013.01); *B21D 39/03* (2013.01)

(58) Field of Classification Search
CPC .. B21D 55/00; B30B 1/12; B30B 1/04; B30B 1/326; B30B 15/285; F16P 3/00; B21J 15/28
See application file for complete search history.

(56) References Cited

U.S. PATENT DOCUMENTS

| | | | |
|---|---|---|---|
| 2,199,501 | A | 5/1940 | MacBlane |
| 2,222,851 | A | 11/1940 | MacBlane |
| 2,400,486 | A | 5/1946 | Carlyle |
| 4,105,899 | A | 8/1978 | Velosa |
| 4,457,418 | A | 7/1984 | Johnston |
| 5,381,661 | A | 1/1995 | Malina |
| 5,937,694 | A | 8/1999 | Mueller |
| 6,114,690 | A | 9/2000 | Oei et al. |
| 6,737,765 | B2 | 5/2004 | Gharst |
| 6,779,343 | B2 | 8/2004 | Sawdon |

(Continued)

FOREIGN PATENT DOCUMENTS

| | | |
|---|---|---|
| BE | 1016759 A3 | 6/2007 |
| DE | 4236057 A1 | 4/1994 |

(Continued)

OTHER PUBLICATIONS

"Universal Hydraulic Presses for Production & Prototype Applications," www.btmcorp.com, 2004, 4 pages.

(Continued)

*Primary Examiner* — Pradeep C Battula
(74) *Attorney, Agent, or Firm* — Harness, Dickey & Pierce, PLC

(57) ABSTRACT

A safety power assist for a manual press is provided. In another aspect, a press includes a tool, a manual actuator, a switch and an automatically powered actuator. A further aspect of the present press employs a spring which must be compressed beyond a predetermined pinching force before a switch is activated, where switch activation causes an automatically powered actuator to advance a workpiece-contacting punch or tool.

31 Claims, 16 Drawing Sheets

(56) References Cited

U.S. PATENT DOCUMENTS

| | | |
|---|---|---|
| 7,108,459 B1 | 9/2006 | Mueller |
| 7,114,436 B1 | 10/2006 | Mueller |
| 7,263,831 B2 | 9/2007 | Sawdon et al. |
| 7,267,512 B1 | 9/2007 | Mueller |
| 7,685,925 B2 | 3/2010 | Sawdon et al. |
| 7,694,399 B2 | 4/2010 | Sawdon et al. |
| 2001/0032553 A1 | 10/2001 | Finkler |
| 2008/0295709 A1 | 12/2008 | Rapp |
| 2012/0137496 A1* | 6/2012 | Sawdon ............... B23P 19/062 29/432 |
| 2014/0251166 A1* | 9/2014 | Babiel .................... B30B 1/326 100/137 |

FOREIGN PATENT DOCUMENTS

| | | |
|---|---|---|
| DE | 4322318 A1 | 1/1995 |
| DE | 102004007265 A1 | 9/2005 |
| DE | 102005025756 A1 | 1/2006 |
| GB | 2028951 A | 3/1980 |
| JP | 2004337897 | 12/2004 |

OTHER PUBLICATIONS

Gechter.com—presses publication, Oct. 14, 2015, 16 pages.

"Tox—Pressotechnik—Prasy kolanowe z pneumatycznym skokiem roboczym," published or offered for sale prior to May 20, 2016, with English translation description thereof, 1 page.

"Hydraulic press safety is vital in automotive manufacturing," www.fluidpowerworld.com, May 19, 2016, 2 pages.

"Technical Advisory for Safe Use of Power Presses and Press Brakes," www.wshc.gov.sg, Jun. 2009, 30 pages.

"Bedienungsanleitung für Gechter—Presse, TYP—HKP/L 13/ 20 kN," www.Gechter.com, published or sold in 2007, 12 pages.

* cited by examiner

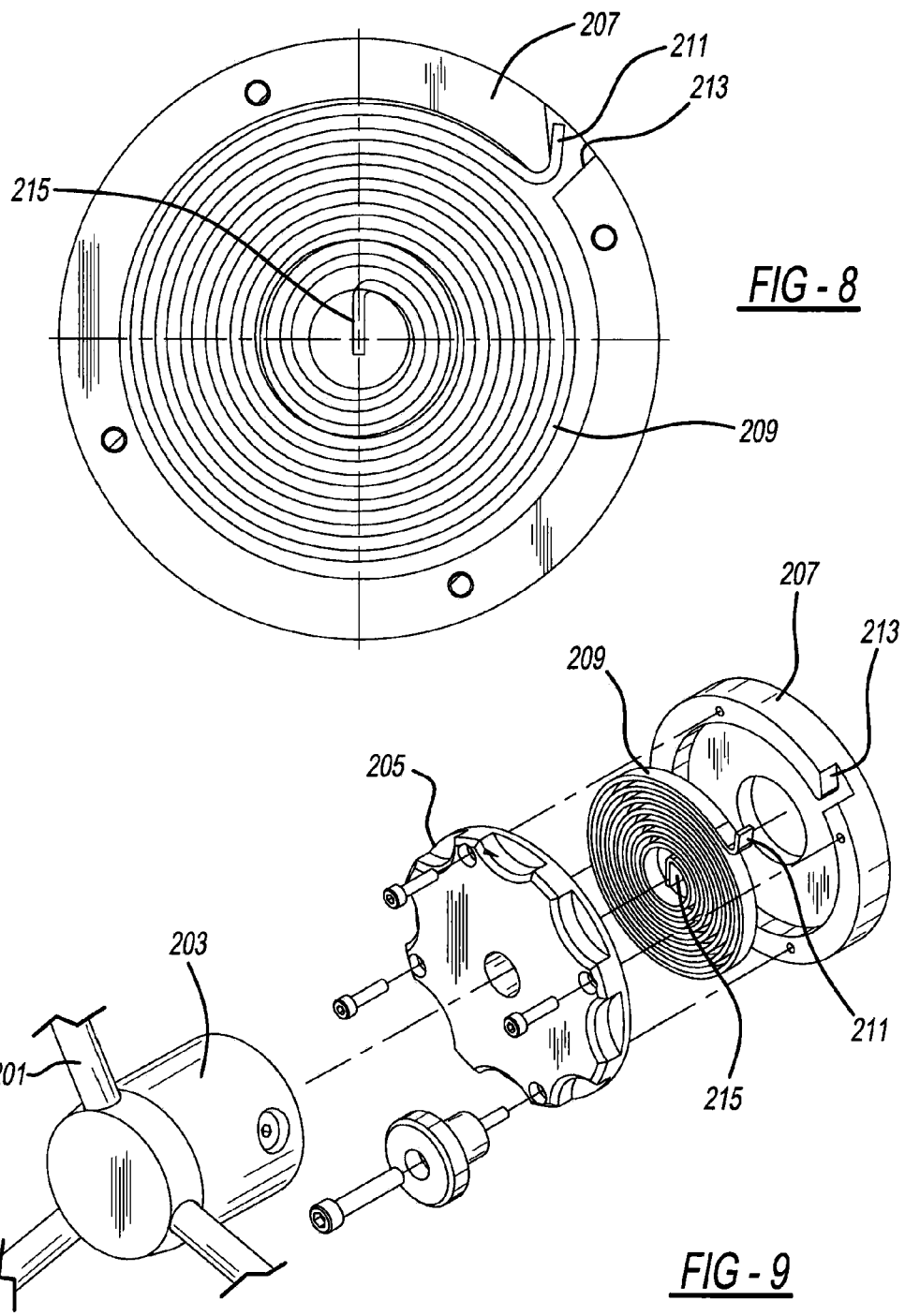

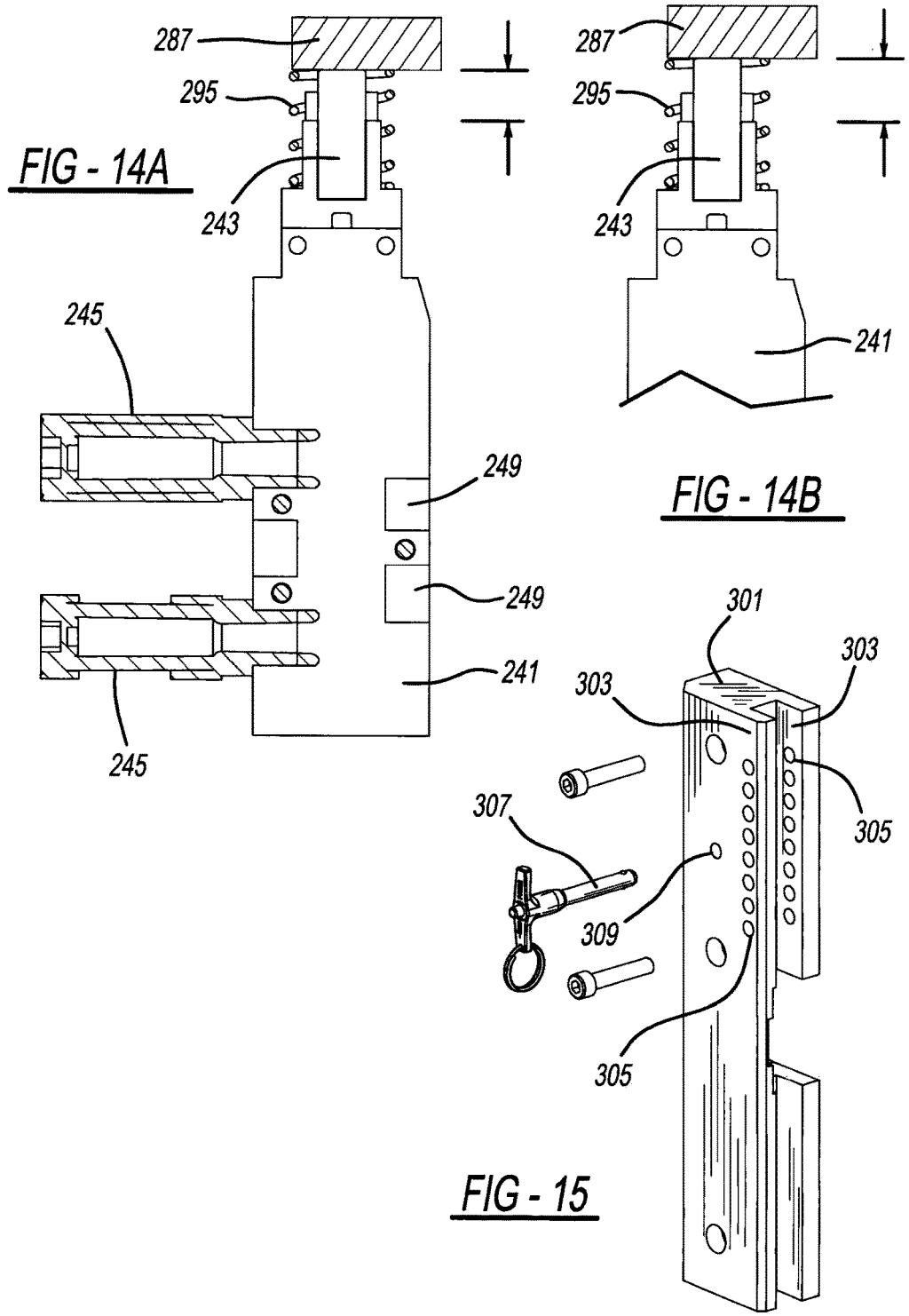

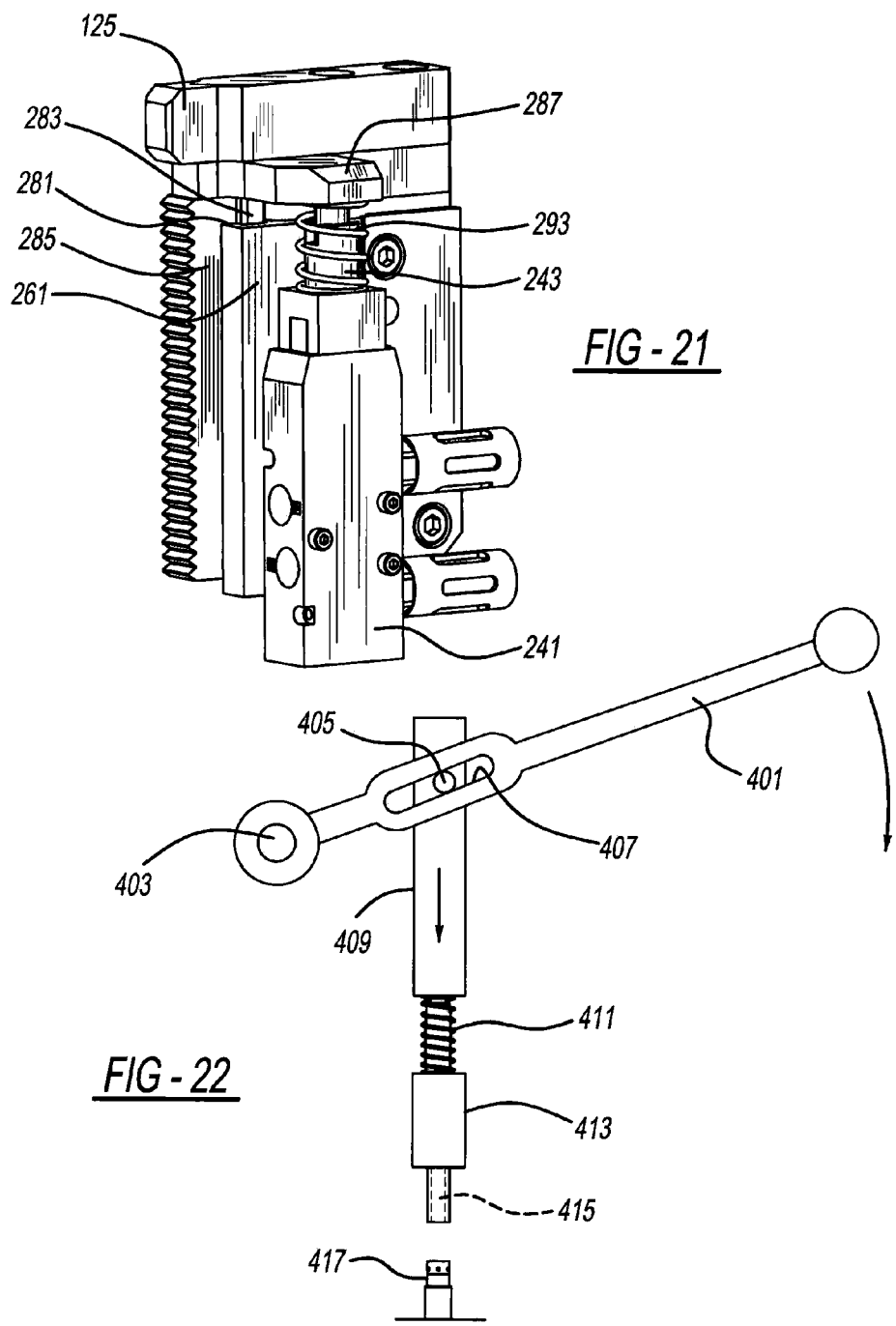

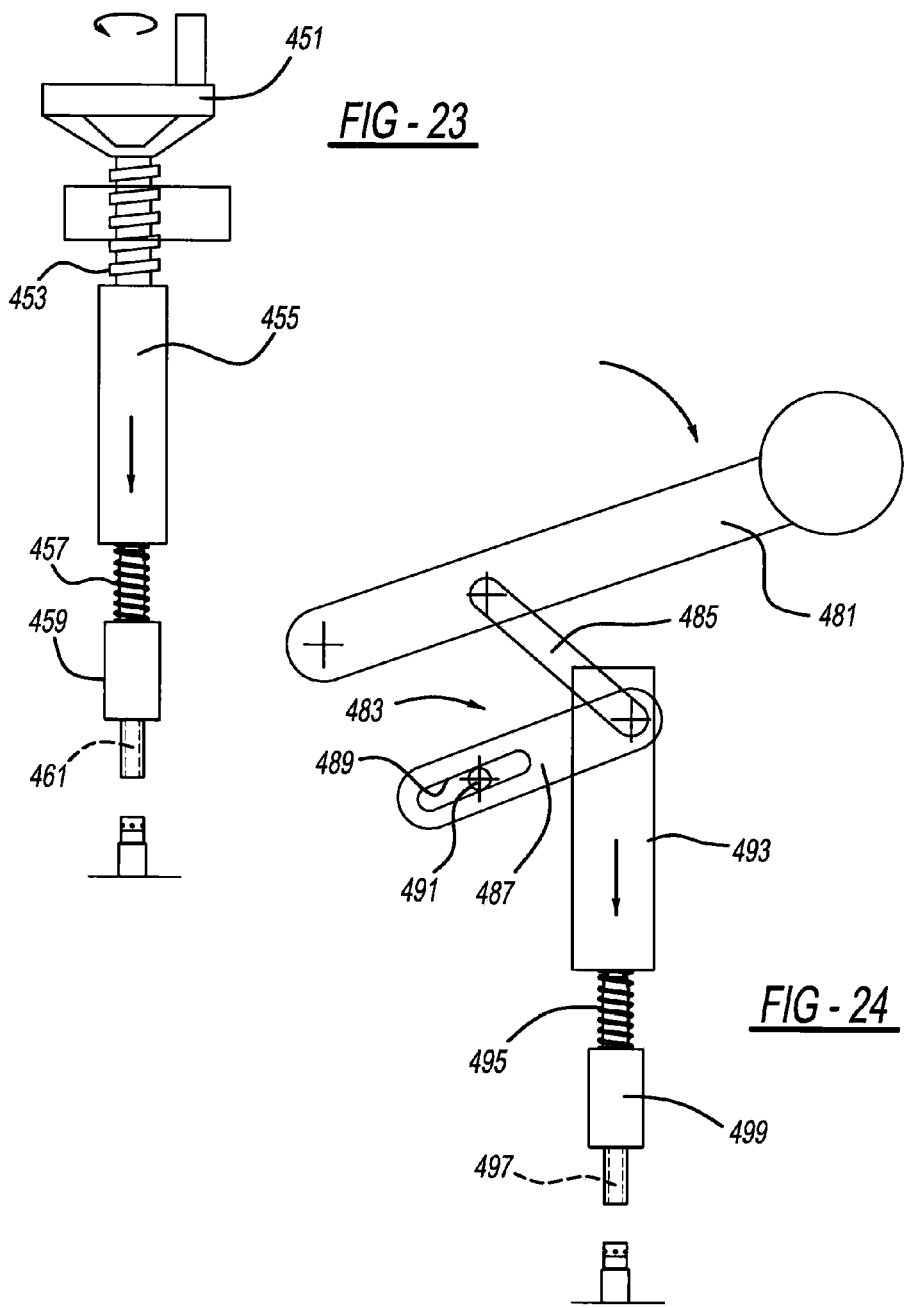

SAFETY POWER ASSIST FOR MANUAL PRESS

BACKGROUND AND SUMMARY

The present disclosure relates generally to a press machine and more particularly to a safety power assist for a manual press.

Metal working presses are well known in the industry. Traditional fluid or electric motor actuated presses employ complicated optical sensors or light curtains adjacent a punch to stop punch advancement if a machine operator's finger or hand obstructs the optical path. One such traditional optical safety system is disclosed in U.S. Pat. No. 6,114,690 entitled "Light-Controlled Safety Switch for a Punch Press" which issued to Oei et al. on Feb. 5, 2000, and is incorporated by reference herein. Such conventional optical safety systems are very expensive and are prone to false obstruction detections due to common workplace dirt and contamination.

Another conventional approach is disclosed in U.S. Pat. No. 7,114,436 entitled "Safety Interlock and Retraction Mechanism for Clinching, Crimping, and Punching Presses" which issued to Mueller on Oct. 3, 2006. This patent is incorporated by reference herein. This traditional device employs a foot-operated pneumatic valve to activate pneumatic cylinders of a safety interlock and retraction mechanism. Full force actuation of the press is prohibited unless a predetermined thickness range of desired work material is placed between a punch and die of the press. This conventional device, however, adds undesired complexity and expense for a solely automatically actuated device.

In accordance with the present invention, a safety power assist for a manual press is provided. In another aspect, a press includes a tool, a manual actuator, a switch and an automatically powered actuator. A further aspect of the present press employs a spring which must be compressed beyond a predetermined pinching force before a switch is activated, where switch activation causes an automatically powered actuator to advance a workpiece-contacting punch or tool. Another aspect of the present press includes a wall with multiple holes, and a pin which is removeably insertable into at least one of the holes to adjustably limit retracted movement of a tool to provide shorter cycle times between repeated tool advancements as compared to if the pin was not inserted. A method of operating a press is also provided.

The press of the present system is advantageous over traditional press safety devices. For example, the present press does not employ an optical or a light obstruction detector, but instead uses a mechanical pinching arrangement which allows the machine operator to manually stop and reverse movement of the tool prior to automatic advancing movement of the tool. This present construction is significantly less expensive than prior safety systems, considerably more durable and robust in a dirty manufacturing environment, and is not prone to false obstacle detection. Additional advantages and features of the present press can be ascertained from the following description and claims, as well as the appended drawings.

BRIEF DESCRIPTION OF THE DRAWINGS

FIG. 5 is a longitudinally sectioned view showing upper and lower tools employed in the present press;

FIG. 8 is a side elevational view showing a clock spring assembly employed with a manual handle of the present press;

FIG. 9 is an exploded perspective view showing the manual handle, a hub and the clock spring assembly employed in the present press;

FIGS. 14A and B are partially fragmented views, taken along line 14-14 of FIG. 10, showing the switch valve actuator assembly of the present press in different operating conditions;

FIG. 15 is an exploded perspective view showing a gear cover and removable upstop pin employed in the present press;

FIG. 21 is a perspective view showing the switch valve actuator assembly of the present press in a retracted or pinching position;

FIG. 22 is a diagrammatic side view showing an alternate embodiment manual actuator and transmission of the present press;

FIG. 23 is a diagrammatic side view showing another alternate embodiment manual actuator and transmission of the present press; and FIG. 24 is a diagrammatic side view showing another alternate manual actuator and transmission of the present press.

DETAILED DESCRIPTION

Figure 1:
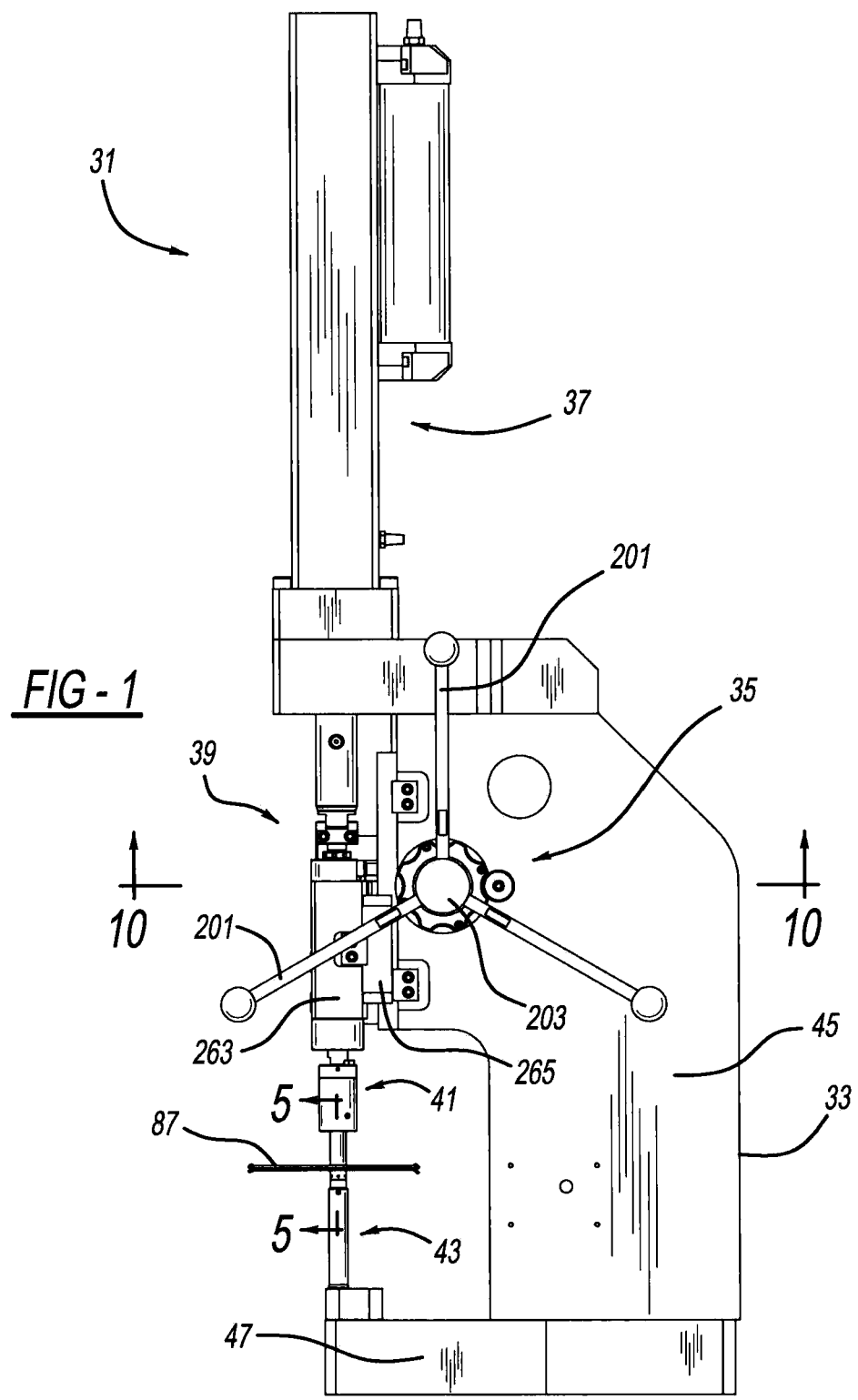
FIG. 1 is a side elevational view showing the present press.

Referring to FIGS. 1-3 and 4, a preferred embodiment of the present press machine 31 includes a frame 33, a manual actuator 35, an automatically powered actuator 37, a switch valve actuator assembly 39, an upper tool assembly 41 and a lower tool assembly 43. Frame 33 is a rigid and generally C-shaped member including a frame body 45 and a frame anvil or base 47 affixed thereto with threaded cap screw fasteners and dowel pins. Frame 33 is stationarily mounted directly or indirectly to a factory floor.

When used for clinching, upper tool 41 includes a longitudinally elongated punch 71, a punch holder 73, a circular-cylindrical outer housing 75, a compression spring 77 and a stripper 79. Stripper 79 has a laterally projecting disk-like section 81 and a circular-cylindrical can section 83 with a central aperture therein. A workpiece-contacting surface 85 of stripper 79 operably pushes against an upper surface of sheet-metal workpieces 87 or a press-operator's body part (as will be discussed hereafter) since spring 77 downwardly biases section 81 of stripper 79 away from holder 73. A workpiece-contacting distal end of punch 71 extends through the aperture in stripper 79 when the upper tool is advanced to a position further compressing spring 77. Holder 73 is further mounted to a holder extension 89 by threaded screw fasteners.

The preferred lower tool 43 includes a die body 91, an outer circular-cylindrical shield 93, multiple moveable die blades 95, and an O-ring or canted coiled spring retainer 97 moveably securing the die blades within the shield and biasing them toward a central anvil 99 of die body 91. A central tail of die body 91 is fastened within an upstanding die holder 101 which is, in turn, fastened within a supplemental die holder 103 mounted to frame anvil 47 by threaded fasteners or the like. The preferred upper and lower tools 41 and 43 are optimally used for forming a clinch joint between multiple sheet metal workpieces 87. These upper and lower tools are disclosed within U.S. Pat. No. 7,694,399 entitled "Sheet Fastening Apparatus and Method" which issued to Sawdon et al. on Apr. 13, 2010, and is incorporated by reference herein.

Figure 2:
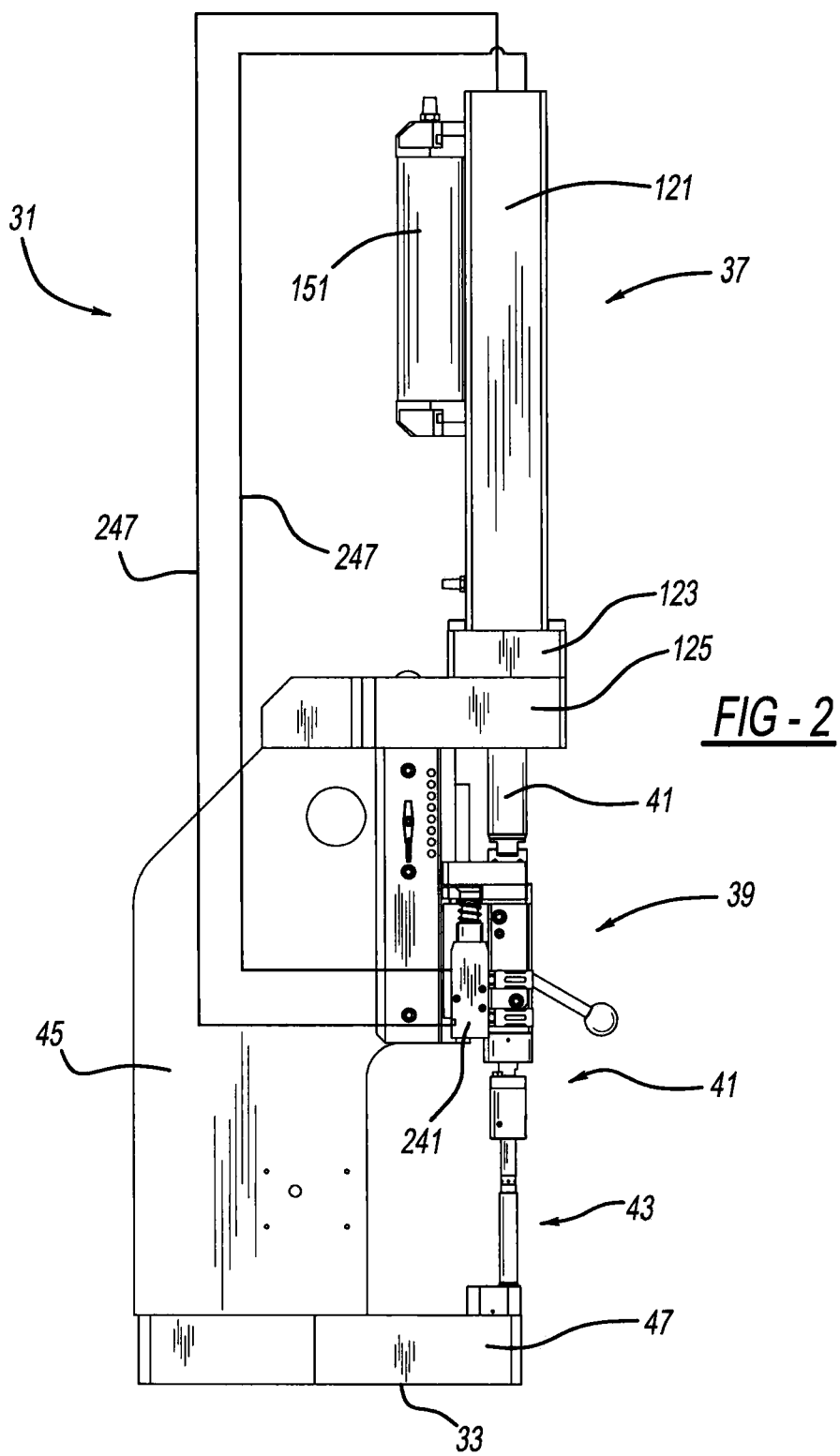
FIG. 2 is a side elevational view, taken opposite that of FIG. 1, showing the present press.
Figure 3:
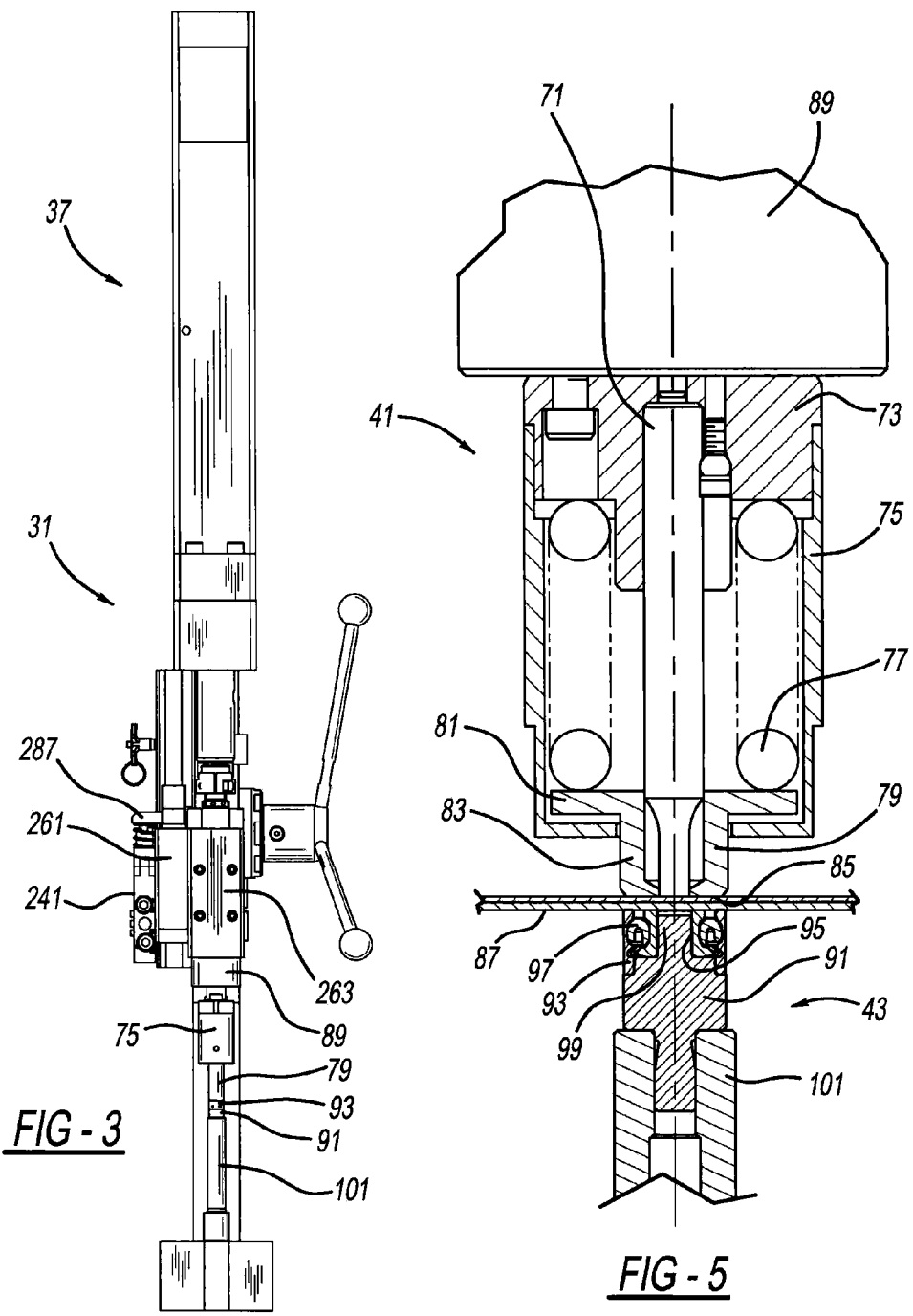
FIG. 3 is a front elevational view showing the present press.
Figure 4:
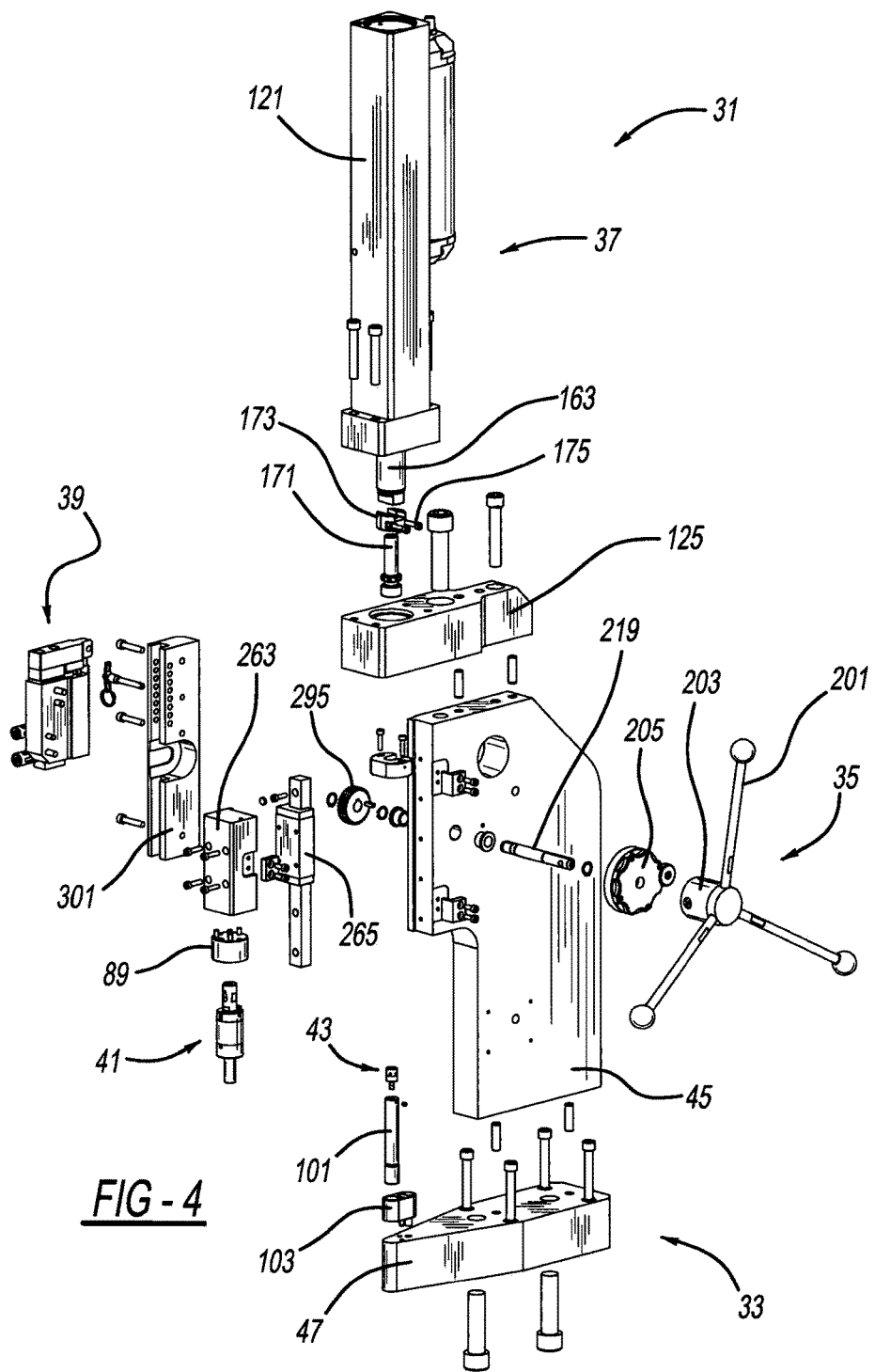
FIG. 4 is an exploded perspective view showing the present press.
Figure 6:
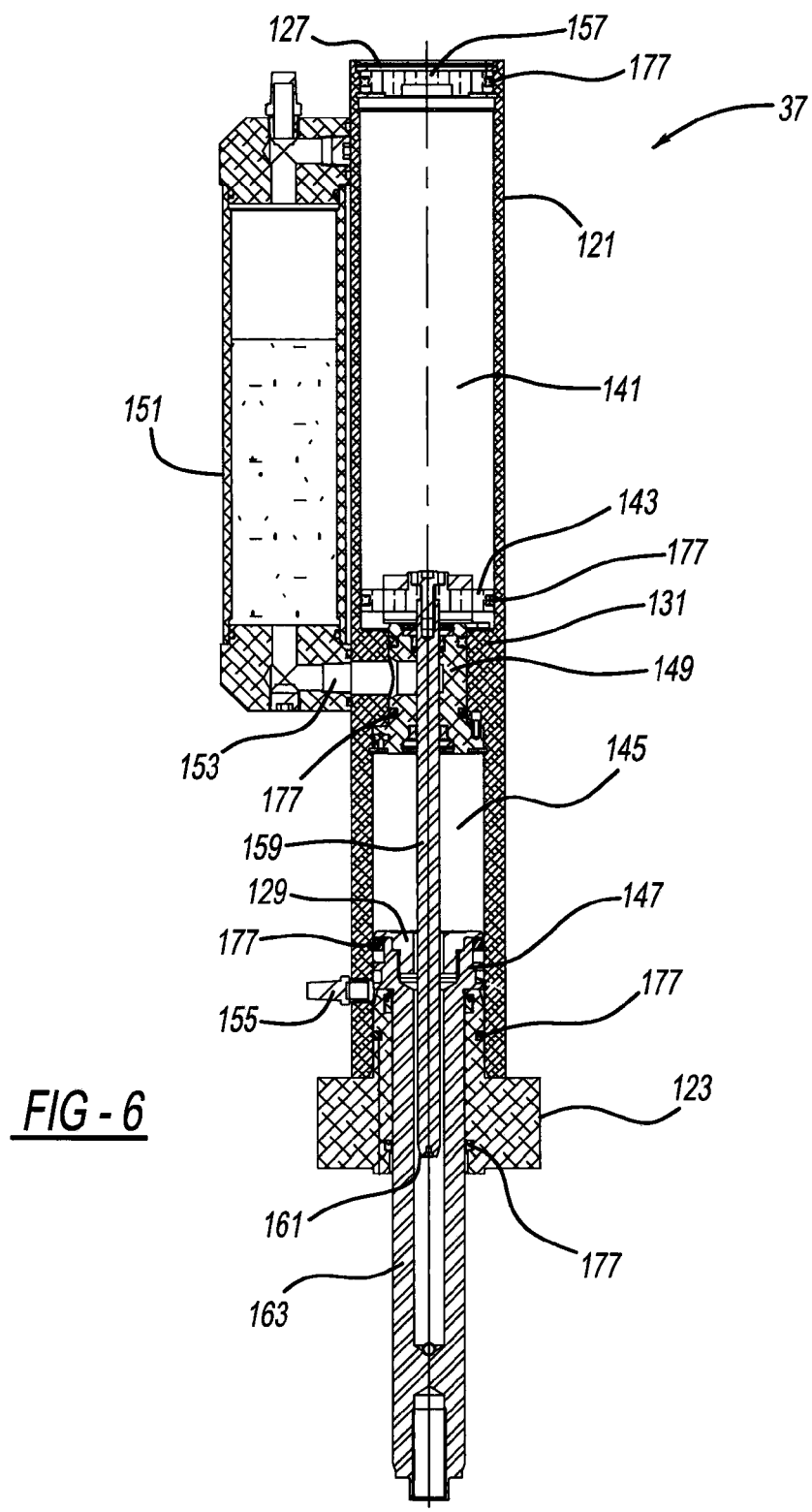
FIG. 6 is a longitudinally sectioned view showing an automatically powered actuator employed in the present press.
Figure 7:
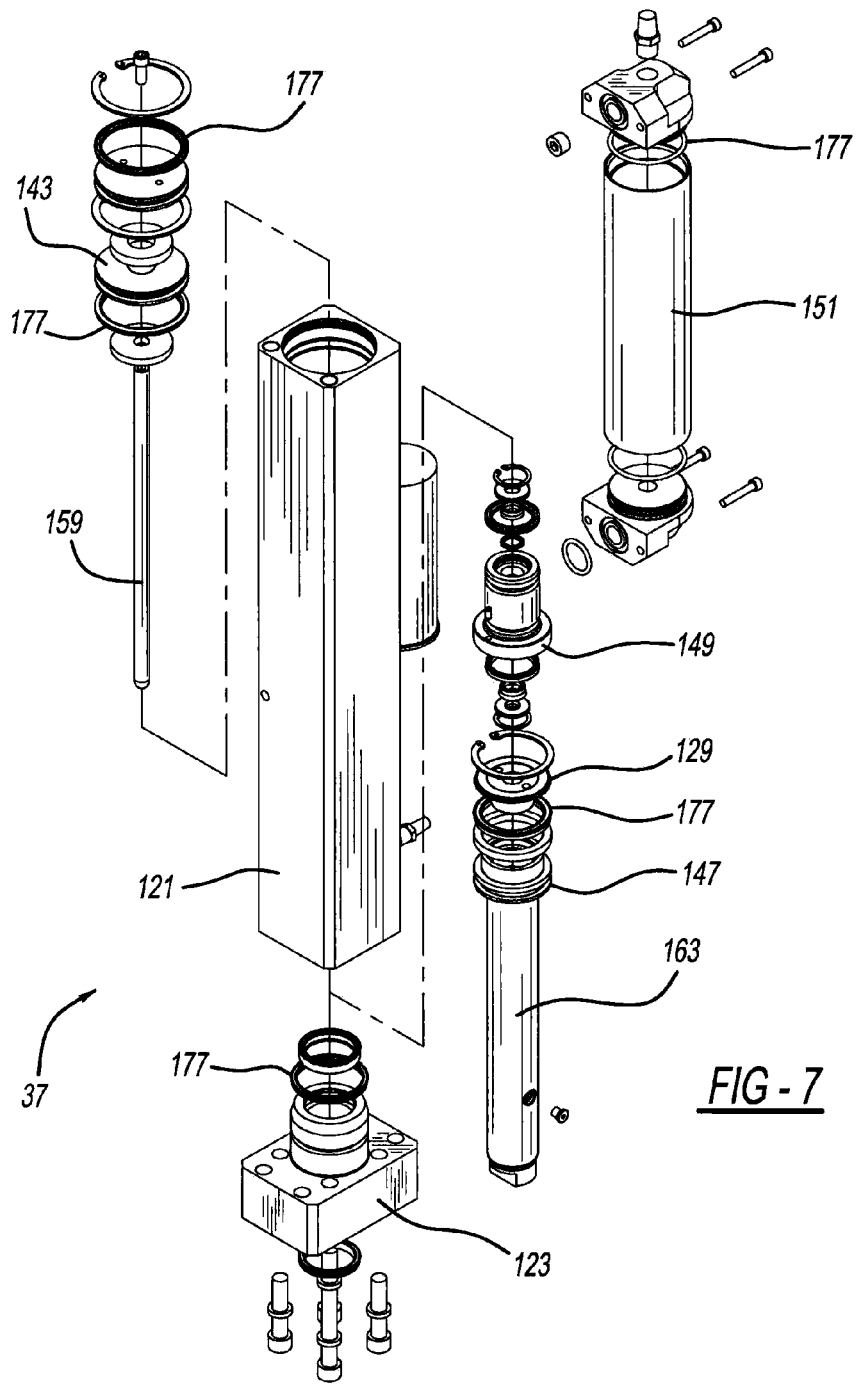
FIG. 7 is an exploded perspective view showing the automatically powered actuator of the present press.
Figure 10:
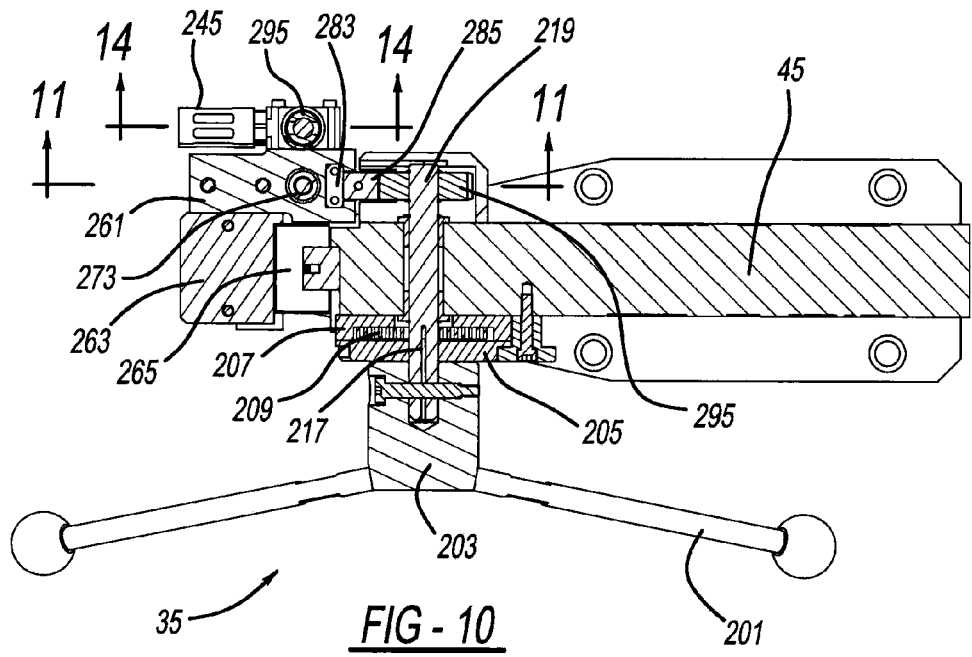
FIG. 10 is a cross-sectional view, taken along line 10-10 of FIG. 1, showing the present press.
Figure 11:
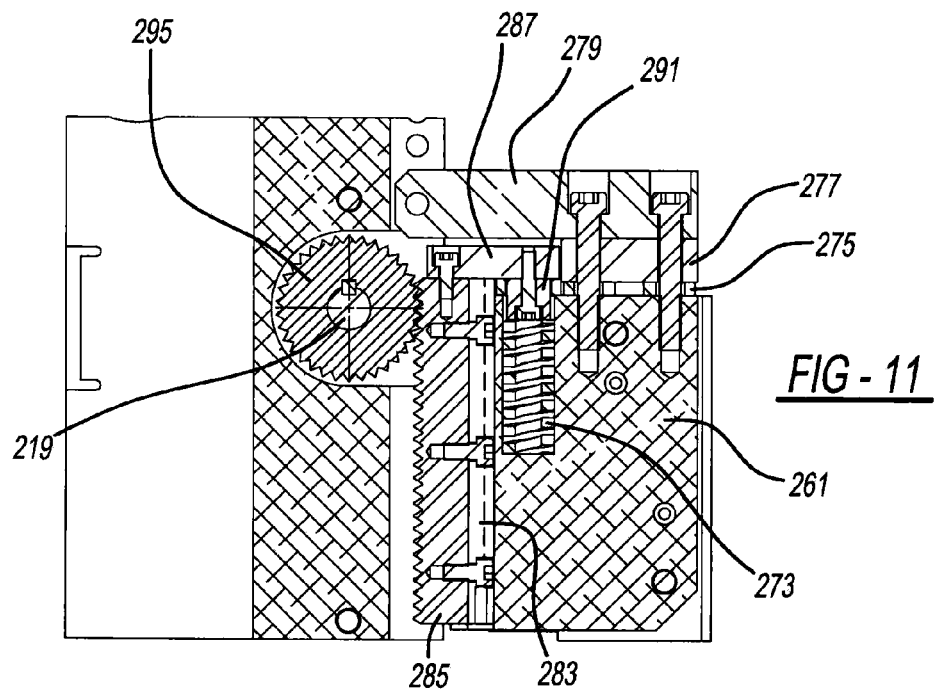
FIG. 11 is a longitudinally sectioned view, taken along line 11-11 of FIG. 10, showing a portion of the press.
Figure 12:
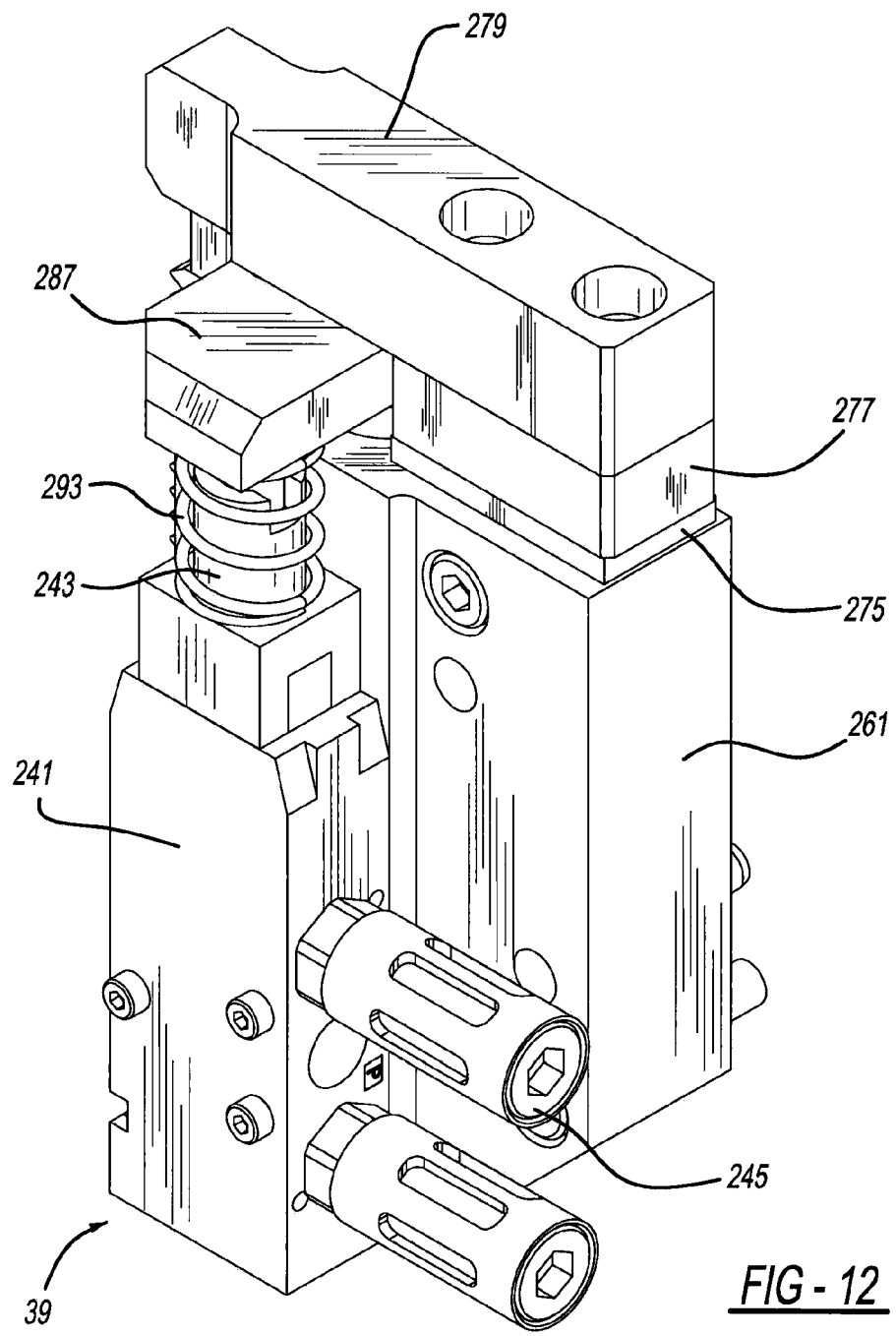
FIG. 12 is a perspective view showing a switch valve actuator assembly of the present press.
Figure 13:
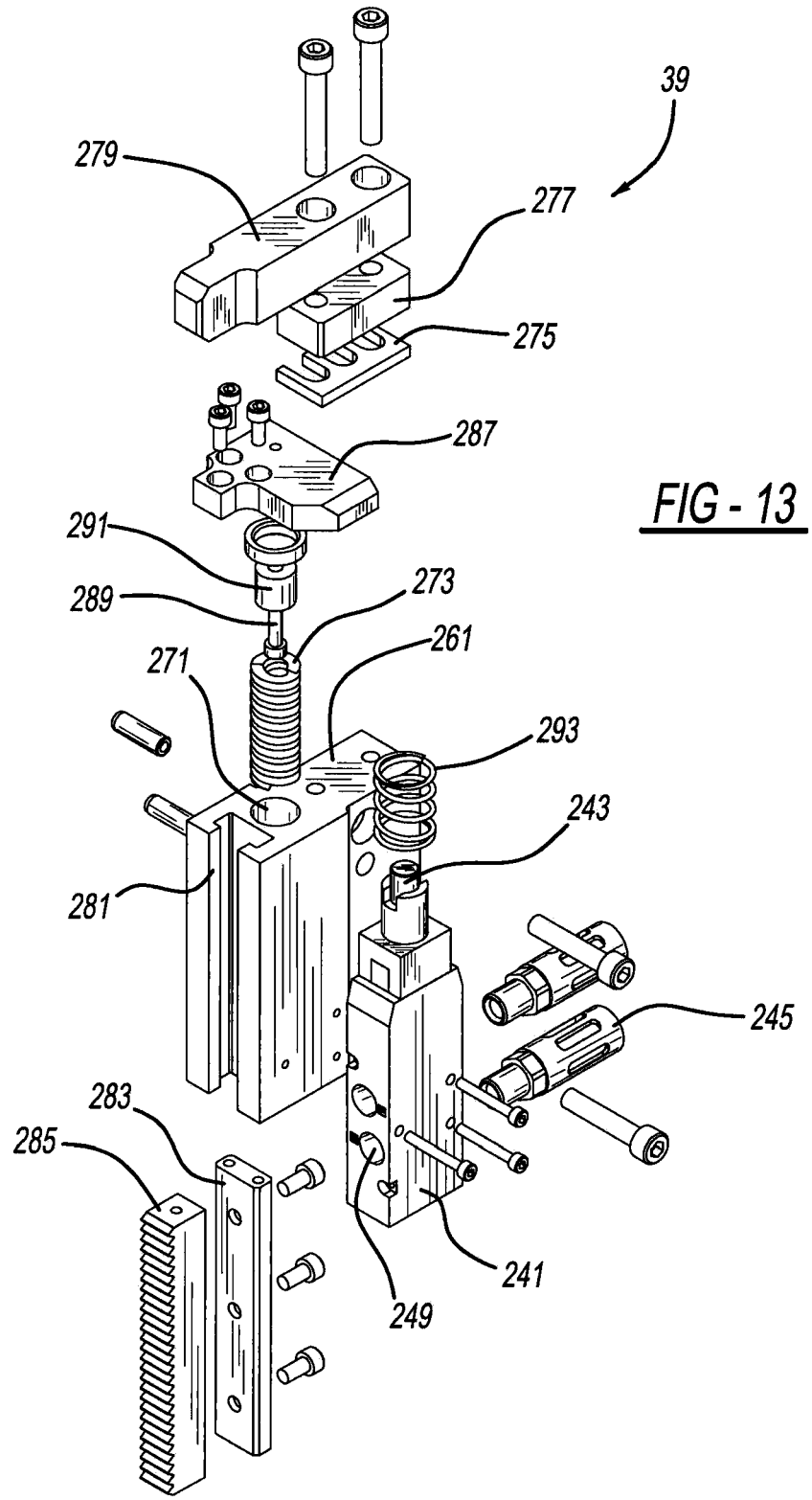
FIG. 13 is an exploded perspective view showing the switch valve actuator assembly of the present press.
Figure 16:
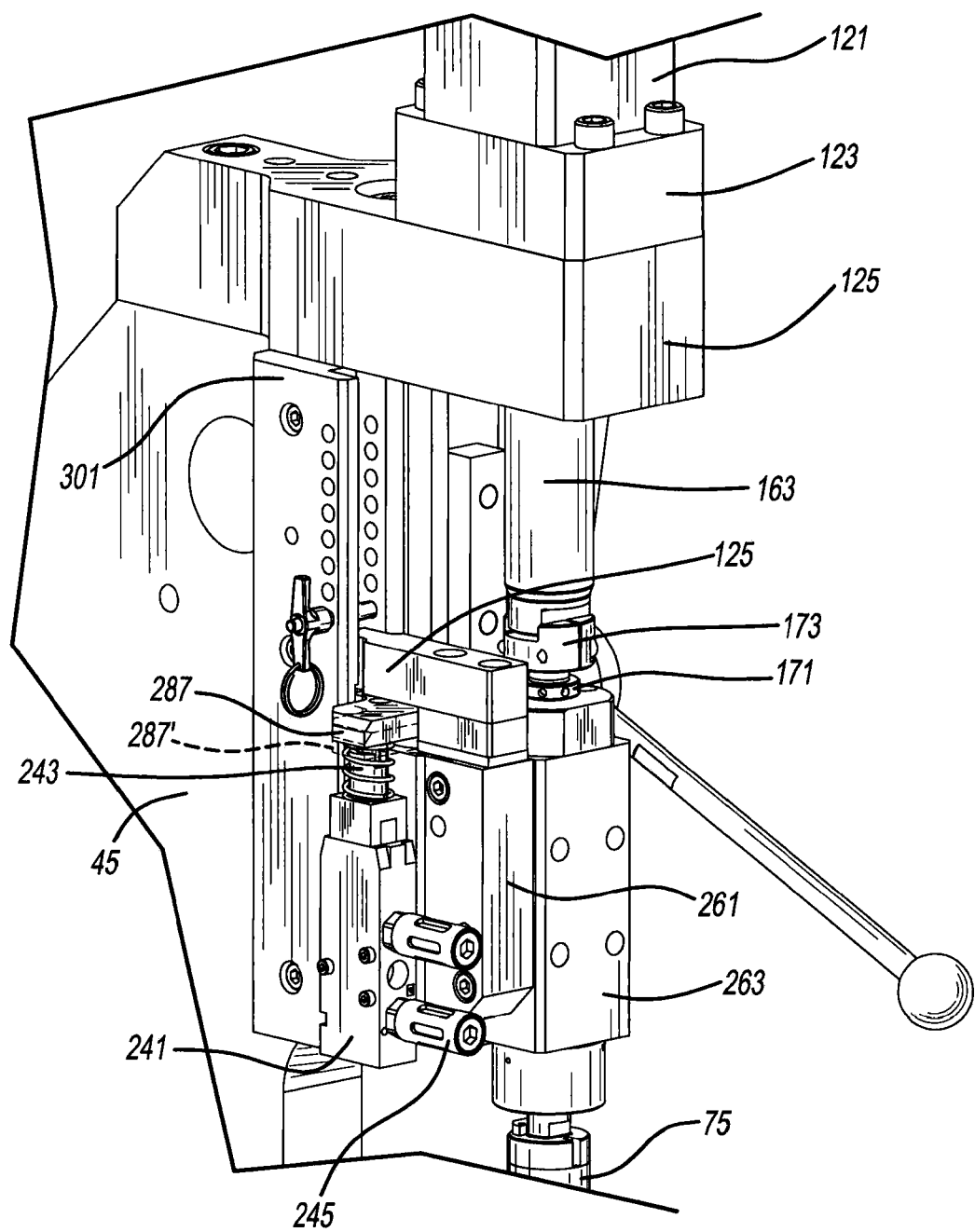
FIG. 16 is a perspective view showing a central section of the present press.

Reference will now be made to FIGS. 2, 6 and 7. Automatic actuator 37 is an air-to-oil intensifying cylinder of the general type disclosed in U.S. Pat. No. 7,263,831 entitled "Air-To-Oil Intensifying Cylinder" which issued to Sawdon et al. on Sep. 4, 2007, and U.S. Pat. No. 6,779,343 entitled "Air To Oil Intensifier" which issued to Sawdon on Aug. 24, 2004, both of which are incorporated by reference herein. The air-to-oil intensifier of automatic actuator 37 includes a longitudinally elongated and hollow housing 121. A front end cap 123 is firmly affixed to a lower end of housing 121 and includes a laterally extending flange which is mounted to a laterally elongated support 125, which in turn, is fastened to a top surface of frame body 45. A rear end cap 127 is firmly attached to an opposite top end of housing 121, and a central and integrally machined bulkhead divider 131 is disposed internal to housing 121.

An air cylinder cavity 141 is defined between end cap 127 and bulkhead divider 131 within which a first piston 143 linearly moves. An oil cylinder cavity 145 is located between bulkhead divider 131 and lower end cap 123 within which a second piston 147 linearly moves. Furthermore, an intermediate cap 129 is threadably engaged within and moves with piston 147. An oil valve assembly 149 is located within bulkhead divider 131 and is controlled to fluidically allow passage of the hydraulic oil between a storage tank 151, externally mounted to housing 121, and oil cylinder cavity 145 through a first oil port 153. Another oil port 155 is in communication with cavity 145 between an opposite face of second piston 147 and cap 123. Air ports 157 communicate with air cavity 141 on opposite faces of piston 143.

A longitudinally elongated piston rod 159 is centrally attached to and extends from first piston 143 such that a distal end 161 of piston rod 159 projects through intermediate cap 129 and into a hollow center of a piston rod 163 integrally longitudinally extending from second piston 147. Piston 163 serves as a linearly advancing and retracting ram which is coupled to upper tool assembly 41 via an adjustment coupler 171 and a coupling ring 173 by way of a pair of laterally extending threaded fasteners 175. Multiple seals 177 are located within housing 121 for the pistons and caps.

Manual actuator 35 can be observed in FIGS. 1, 4 and 8-11. Manual actuator 35 includes multiple elongated handles 201 secured to a central hub 203. Handles 201 are rotatable more than 360°. A pair of generally circular covers 205 and 207 sandwich a wound clock spring 209 therebetween which provides a counterbalancing force. An upturned outer end 211 of clock spring 209 is located within a slot 213 of cover 207 while an upturned inner end 215 of clock spring 209 is secured within an internal slot 217 of a laterally extending shaft 219. Covers 205 and 207 are stationarily fastened to frame body 45 while shaft 219 rotates with handle 201 and hub 203. Clock spring 209 is configured to bias handle 201 and a transmission mechanism attached thereto toward a retracted position to at least partially offset the effects of gravity and to require less retraction force should an undesired obstacle be encountered. Moreover, a spur or pinion gear 295 is connected to and rotates with shaft 219.

Referring now to FIGS. 10-14, 16, 20 and 21, valve actuator assembly 39 includes a pneumatically valved switch 241 having a linearly depressible plunger or button 243 on an upper end thereof. Silencers 245 are coupled to a body of switch 241. Furthermore, pneumatic lines 247 couple ports 249 of switch 241 with ports of automatically powered actuator 37 for controlling activation thereof.

A carriage 261 is securely fastened to a slide block 263, which in turn, is securely fastened to a car 265. The body of switch 241 is also fastened to a lateral side of carriage 261 for movement therewith. A longitudinally bored pocket 271 is located in an upper portion of carriage 261 for receiving a compression spring 273 therein. A shim 275, spacer 277 and laterally elongated head 279 are securely fastened on top of carriage 261 such that an open space is located between a lower surface of head 279 and a corresponding upper surface of carriage 261 above pocket 271.

Carriage 261 further includes a generally C-shaped undercut channel 281 extending in a longitudinal direction. A longitudinally elongated carrier 283 is received within channel 283 of carriage 261 such that carrier 283 is linearly and longitudinally moveable relative to carriage 261 in a lost-motion manner in at least some operating conditions. A gear toothed and longitudinally elongated rack 285 is securely fastened to carrier 283 for movement therewith. Rack 285 and pinion gear 295 act as the manual transmission mechanism. Moreover, an abutment plate or arm 287 is securely fastened to upper surfaces of rack 285 and carrier 283 for movement therewith. A central pin 289 and collar 291 are mounted to an underside surface of abutment plate 287 such that pin 289 extends within spring 273. The undersurface of plate 279 and/or bottom surface of collar 291 are interchangeably referred to herein as a spring abutment surface. Accordingly, the abutment surface operably contacts against and compresses spring 273 as well as another compression spring 275 wound around switch plunger 243. These springs are intended to be redundant with each other and are oriented in a parallel and offset manner.

A gear cover 301 is attached to frame body 45. Gear cover 301 includes at least one, and preferably a pair of longitudinally elongated and bifurcated walls 303, spaced apart by a groove within which rides an end of head 279. A set of longitudinally aligned holes 305 is located in each wall 303. A laterally elongated and cylindrical pin 307 has a T-shaped handle on an end thereof. An end of pin 307 may optionally contain an outwardly biased detent ball or hole for removeably receiving a cotter pin to prevent undesired machine vibrations from causing the pin to fall out of the gear cover. Pin 307 serves as a stop surface to prevent a narrowed width distal end of head 125 from linearly retracting past the pin location when the head, tool and associated mechanisms are manually retracted. This upstop construction is ideally suited when fast cycle times are desired for repeated operations on the same workpiece. Furthermore, a storage hole 309 is provided in gear cover 301 such that pin 307 can be inserted therein if the full retraction movement or stroke is desired.

Figure 17:
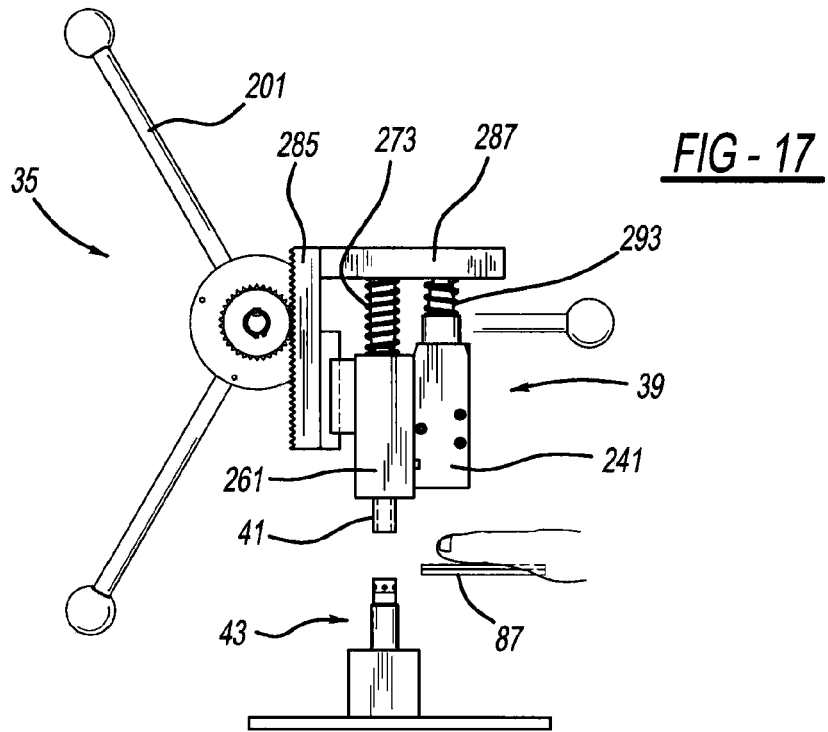
FIG. 17 is a diagrammatic side view showing the present press in a retracted position.

Operation of the present press can best be observed by comparing FIGS. 17-21 and also with reference to FIGS. 10, 11, 13 and 16. FIG. 17 illustrates handle 201 of manual actuator 35 rotated such that valve actuator assembly 39 and upper tool 41 are in a retracted position spaced away from lower tool 43. In this operating condition, abutment plate 287 is fully spaced away from switch 241 to the fullest extent allowed in the space bordered by head 279 such that springs 273 and 293 are essentially not compressed or minimally compressed in this condition as shown in FIG. 21.

Figure 18:
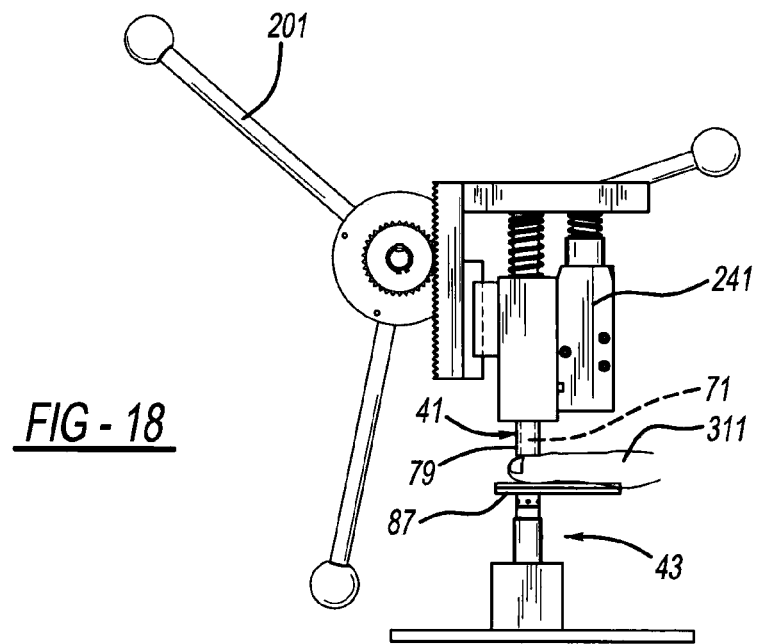
FIG. 18 is a diagrammatic side view showing the present press in a finger-pinching intermediate position.

FIG. 18 illustrates the situation where the human machine operator's body part, such as a hand or finger 311, is inadvertently located between or obstructs punch 71 of upper tool assembly 41 and the workpiece. The operator has rotated handle 201 to simultaneously downwardly advance upper tool 41 and switch 241 toward lower tool 43. In this operating condition, upper tool 41, more specifically a lower surface of stripper 79, pinches finger 311 between it and workpieces 87. This undesired tool-to-finger contact during manual tool advancement incurs an uncomfortable but not harmful pinching force preferably of at least fifty pounds per square inch and less than or equal to one hundred pounds per square inch. In this pinching scenario, abutment plate 287 has not yet compressed springs 273 and 293 enough to depress plunger 243 such that switch 241 has not yet activated the automatically powered actuator cylinders. If a pinched condition is felt by the operator, the operator can then manually reverse rotation of handle 201 so as to remove the obstruction prior to automatically powered punch advancement.

Figure 19:
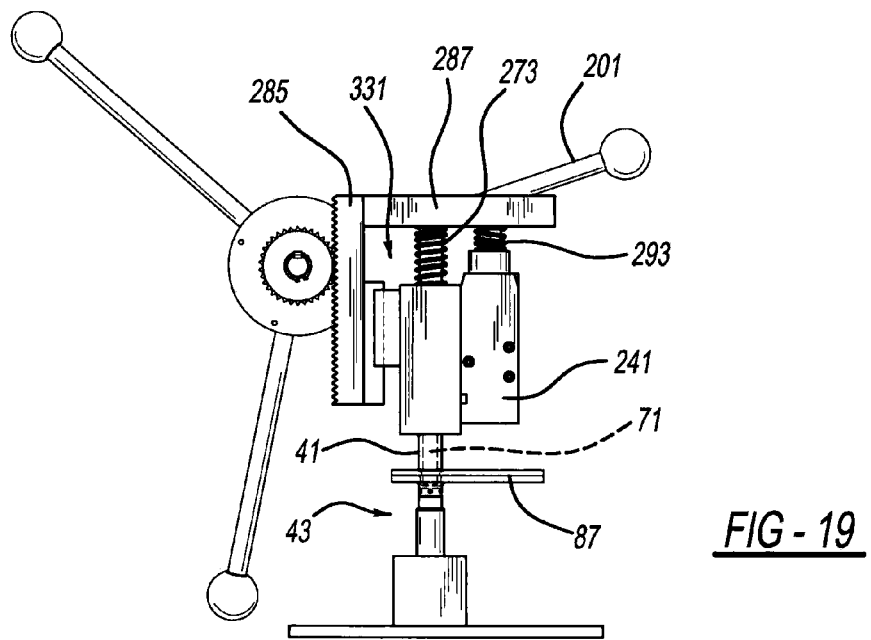
FIG. 19 is a diagrammatic side view showing the present press in a fully advanced and workpiece engaging position.
Figure 20:
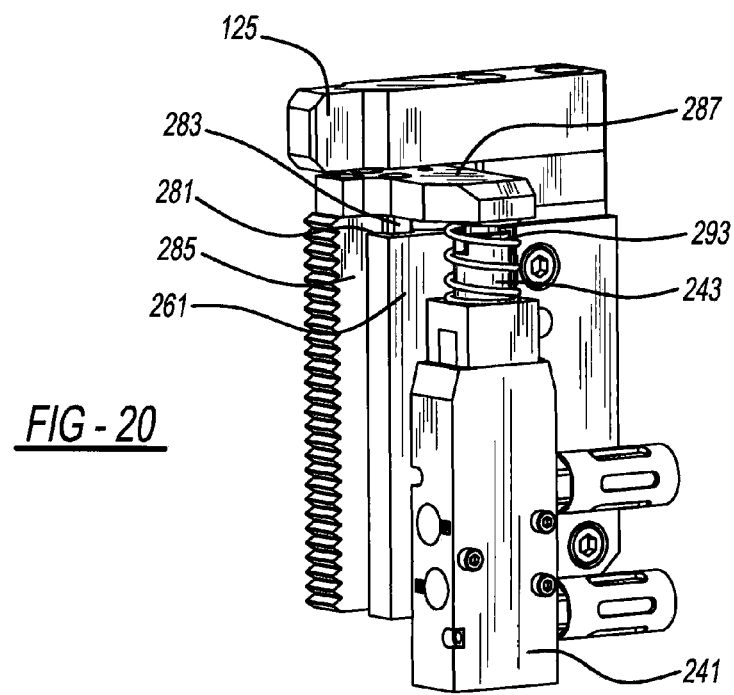
FIG. 20 is a perspective view showing the switch valve actuator assembly of the present press in a switch activating position.

FIGS. 19 and 20 illustrate the desired metal-working operating condition, without the presence of the body part or other obstruction. In this situation, a lost motion coupling 331 allows limited independent movement caused by relative movement of rack 285 and carrier 283 relative to channel 281 of carriage 261. This allows further advancing rotation of handle 201 to linearly advance rack 285 which causes the abutment surface of abutment plate 287 to fully compress springs 273 and 293. Thereby, plunger 243 causes switch 241 to activate and energize the powered actuator which, in turn, automatically advances punch 71 to deform workpieces 87 against the aligned die of lower tool assembly 43.

In other words, the upper tool is manually advanced to contact against the workpieces by the pinion gear linearly driving the rack. The switch is moved with the rack the full distance in the normal nonobstructed situation. Then, further manual turning of the handle will move the rack and abutment plate a small distance until the switch is activated to automatically drive the punch into the workpiece in a "power assist" manner. After the clinch joint is created, automatically powered actuator retracts punch and the operator manually retracts the tool and switch assemblies.

FIG. 22 shows an alternate embodiment of a manual actuator and transmission mechanism. A lever-arm type of handle 401 is pivotable about a pivot axis 403 less than 360°. A lost motion pin 405 and camming slot 407 are coupled to handle 401 to provide linear motion to a longitudinally elongated ram 409. An end of ram 409 is coupled to an upper tool 413 including a punch 415. Spring 411 allows for a predetermined pinching force to be applied between upper tool assembly 413 and a lower tool assembly 417 against an obstruction therebetween before full compression of spring 411 activates a switch connected to an automatically powered actuator as discussed with the prior embodiment.

Another embodiment of a manual actuator and mechanical transmission is shown in FIG. 23. A rotatable handle, such as a wheel 451 has a jack screw 453 centrally connected thereto which advances and retracts a linearly moving ram 455 coupled thereto. A biasing spring 457, and an upper tool assembly 459, including a punch 461, are also provided. This arrangement allows for pinching force and spring compression due to an obstruction prior to switch activation of an automatically powered actuator to further advance punch 461 as previously described.

FIG. 24 illustrates a lever arm type of manually moveable handle 481 coupled to a toggle mechanism 483. Toggle mechanism 483 includes multiple pivotably attached links 485 and 487, at least one of which may optionally include a lost motion camming slot 489 and cam follower pin 491. A pivot of toggle mechanism 483 is coupled to a linearly moveable ram 493. A compression spring 495 allows a pinching force against an obstruction by punch 497 of an upper tool assembly 499 prior to switch activation of an automatically powered actuator as previously discussed hereinabove.

It is alternately envisioned that the upper tooling for any of the prior embodiments may consist of any type of punch or structure which deforms or acts upon workpieces. Similarly, the disclosed lower tooling may also be replaced by any die or tooling arrangement which assists in deforming or acting upon the workpieces. For example, a stripper and spring may not be necessary when the punch is solely used to pierce a hole in one or more workpieces. Furthermore, the punch and die tooling can be used to set a rivet, set a clinch nut or set a clinch stud fastener. Alternately, the punch and die arrangement may be used to form a bend in one or more workpiece surfaces. Notwithstanding, the present press is ideally suited for use in creating an interlocking clinch joint between two or more sheet metal workpieces.

While various embodiments have been disclosed herein, it should be appreciated that other variations may be employed. For example, an electromagnetic actuator such as a stepper motor, a pneumatic only cylinder, or a hydraulic only cylinder can be employed instead of the preferred automatically powered actuator, although some of the advantages of the present press may not be achieved. Alternate or additional gearing, camming or linkage arrangements may be provided in the present mechanical transmission, however, certain cost and durability features may not be realized. The pinching force compression springs may be replaced by other type of biasing members or moved to alternate locations, although the packaging and durability benefits of the present press may not be realized. An electrical rather than pneumatic switch can be used, but it will not be as advantageous. It should be appreciated that one or more of the features of each of the embodiments and each of the independent and dependent claims may be interchanged and/or combined with each other. It should also be recognized that various changes and modifications may be made without departing from the spirit and scope of the present invention.

The invention claimed is:

1. A press comprising:
   (a) a tool including a punch;
   (b) a frame;
   (c) a manual actuator;
   (d) the tool being operably moveable in a longitudinal direction relative to the frame due to movement of the manual actuator;
   (e) a switch;
   (f) an abutment surface;
   (g) an automatically powered actuator coupled to the punch;
   (h) a biasing member being compressible when the manual actuator is moved in an operating condition which causes the abutment surface to activate the switch, and the switch activation then operably causing the automatically powered actuator to advance the punch; and
   (i) the manual actuator being adapted for reverse movement to retract the tool even after the biasing member has been partially compressed to an intermediate position which is insufficient to cause activation of the switch.

2. The press of claim 1, further comprising:
   a workpiece-clinching die aligned with the punch, the die and the punch being coupled to the frame which is a floor-mounted and stationary C-frame; and
   the automatically powered actuator being coaxially aligned with the punch.

3. The press of claim 1, further comprising:
   a nut-clinching die aligned with the punch, the die and punch being coupled to the frame which is a floor-mounted and stationary C-frame; and
   the automatically powered actuator being coaxially aligned with the punch.

4. The press of claim 1, further comprising:
   a rivet-setting die aligned with the punch, the die and punch being coupled to the frame which is a floor-mounted and stationary C-frame; and
   the automatically powered actuator being coaxially aligned with the punch.

5. The press of claim 1, further comprising:
   a metal piercing die aligned with the punch, the die and punch being coupled to the frame which is a floor-mounted and stationary C-frame; and
   the automatically powered actuator being coaxially aligned with the punch.

6. The press of claim 1, wherein the manual actuator includes an elongated handle rotatable at least 360°, the transmission includes at least one gear, and the biasing member is positioned between a laterally extending plane defined by the abutment surface and a parallel laterally extending plane defined by a portion of the switch.

7. The press of claim 1, further comprising rack-and-pinion gears coupling the actuator to the tool, and the switch being linearly moveable with the tool during movement of the manual actuator in at least one operating condition.

8. The press of claim 1, further comprising toggle links coupling the actuator to the tool, and the switch being linearly moveable with the tool during movement of the manual actuator in at least one operating condition.

9. The press of claim 1, wherein the automatically powered actuator includes a pneumatic cylinder portion and a hydraulic cylinder portion.

10. The press of claim 1, further comprising:
    a slide block being linearly moveable relative to the frame which is stationary, the tool being linearly moveable with the slide block during rotation of the manual actuator;
    a lost-motion coupling allowing the abutment surface to move relative to the switch in at least one operating condition; and
    the automatically powered actuator automatically advancing and retracting the punch relative to a mechanical transmission when the switch is physically contacted by the abutment surface.

11. The press of claim 1, wherein the biasing member includes a spring which must be compressed with at least 50 pounds of force before the abutment surface activates the switch.

12. The press of claim 1, further comprising:
    a clock spring biasing the manual actuator toward a retracted rotational position;
    an operator body part can be removed from the press without harm after the body part is compressed by a surface moveable at least partially with the tool which may occur after the tool is at least partially advanced by the manual actuator but prior to activation of the switch; and
    the tool being retractable by reversal of the manual actuator anytime during manual advancing movement of the tool.

13. The press of claim 1, further comprising:
    a wall including multiple holes; and
    a pin removeably insertable into at least one of the holes to adjustably limit retracted movement of the punch to provide shorter cycle times between repeated punch advancements as compared to if the pin was not inserted.

14. A press comprising:
    (a) a workpiece-engageable punch;
    (b) a workpiece-engageable die aligned with the punch;
    (c) a manually rotatable handle;
    (d) a carriage;
    (e) a gear set adapted to linearly move the carriage relative to the die due to manual activation of the handle, the punch being moveable with the carriage in at least one operating condition;
    (f) a switch;
    (g) an activation surface moveable with the carriage in at least one operating condition;
    (h) a fluid powered actuator adapted to move the punch relative to the carriage in at least one operating condition;
    (i) the activation surface being operable to activate the switch when one is moved relative to the other when the carriage nears a fully advanced operating condition;
    (j) activation of the switch being operable to activate the fluid powered actuator; and
    (k) activation of the fluid powered actuator being operable to advance the punch toward the die after the handle has manually advanced the carriage.

15. The press of claim 14, wherein the switch is a pneumatic switch fluidically coupled to the fluid powered actuator, and the fluid powered actuator includes a pneumatically moveable piston.

16. The press of claim 15, wherein the fluid powered actuator includes a hydraulically moveable piston.

17. The press of claim 15, wherein the fluid powered actuator is elongated in a direction coaxially aligned with the punch.

18. The press of claim 14, further comprising a spring biasing the activation surface away from the switch, and at least 50 pounds of force per square inch being required between the punch and the die before the spring allows the activation surface to physically contact against and activate the switch.

19. The press of claim 18, further comprising a second spring biasing the activation surface away from the switch, the springs being compression springs with central axes located substantially parallel to but offset from each other.

20. The press of claim 14, further comprising:
a stationary frame to which the die is mounted;
the gear set including:
  a pinion gear rotatable by movement of the handle;
  a toothed rack enmeshing with the pinion gear, the rack operably moving with the carriage relative to the frame prior to switch activation, but the rack moving relative to the carriage to activate the switch;
the handle being rotatable greater than 360°;
a spring biasing the handle to rotate in a punch-retracting direction; and
the switch being linearly moveable with the carriage.

21. The press of claim 14, wherein the punch and die clinch together workpieces.

22. The press of claim 14, wherein the punch and die pierce a workpiece.

23. The press of claim 14, wherein the punch and die set a separate fastener in a workpiece.

24. The press of claim 14, wherein the activation surface is part of a laterally enlarged activation plate which is mounted to at least one gear of the gear set, and the activation plate is moveable relative to the switch if a predetermined advancing force is exceeded, and the activation surface mechanically pushes against the switch if the advancing force is exceeded.

25. A press comprising:
(a) a workpiece-clinching tool including a punch;
(b) a frame;
(c) a manually moveable handle coupled to the frame;
(d) a carrier moveable relative to the frame due to movement of the handle;
(e) a switch moveable with the carrier prior to switch activation but movable relative to the carrier to cause the switch activation;
(f) an automatically powered actuator operably moving the punch if the switch is activated; and
(g) at least one spring, activation of the switch and compression of the at least one spring activating the automatically powered actuator if at least 50 pounds per square inch of obstruction force is present when advancing, after which the automatically powered actuator advances the punch.

26. The press of claim 25, wherein the at least one spring compresses a distance sufficient to allow the switch activation if the obstruction force is exceeded.

27. The press of claim 25, further comprising:
an activation surface mounted to and always moveable with the carrier;
a lost-motion connection coupling the carrier to a carriage to which the switch is mounted;
the at least one spring being located between the surface and the switch; and
the surface contacting against the switch if the obstruction force is exceeded.

28. The press of claim 25, wherein:
the switch is a pneumatic switch;
the automatically powered actuator includes a fluid powered cylinder with a piston; and
the handle is rotatable more than 360°.

29. The press of claim 25, further comprising:
a clinching die coupled to the frame in alignment with the punch;
a pinion gear having an axis coupled to the frame, and the pinion gear being rotatable by the handle; and
an elongated, toothed rack enmeshed with the pinion gear and always moving with the carrier.

30. The press of claim 25, further comprising:
a wall including multiple holes; and
a pin removeably insertable into at least one of the holes to adjustably limit retracted movement of the tool to provide shorter cycle times between repeated tool advancements as compared to if the pin was not inserted.

31. The press of claim 25, further comprising toggle linkages coupling the carrier to the handle.

* * * * *